(12) United States Patent
Shutoku et al.

(10) Patent No.: US 7,089,401 B2
(45) Date of Patent: Aug. 8, 2006

(54) DATA RELAY CONTROLLER

(75) Inventors: Toshiyuki Shutoku, Aichi-ken (JP); Shin-ichiro Tomisawa, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 411 days.

(21) Appl. No.: 10/373,152

(22) Filed: Feb. 24, 2003

(65) Prior Publication Data

US 2003/0163720 A1 Aug. 28, 2003

(30) Foreign Application Priority Data

Feb. 26, 2002 (JP) ........................................ 2002-050050

(51) Int. Cl.
*G06F 12/00* (2006.01)

(52) U.S. Cl. ............................. 711/217; 711/4; 711/111; 711/219; 709/3; 709/34; 709/52

(58) Field of Classification Search ...................... 711/4, 711/111, 217, 219; 709/3, 34, 52
See application file for complete search history.

(56) References Cited

U.S. PATENT DOCUMENTS 4,866,717 A * 9/1989 Murai et al. ................. 714/765
5,109,500 A * 4/1992 Iseki et al. ..................... 710/74
5,523,799 A   6/1996 Hattori et al.

FOREIGN PATENT DOCUMENTS

JP           5-40604         2/1993

* cited by examiner

*Primary Examiner*—Jack Lane
(74) *Attorney, Agent, or Firm*—Fish & Richardson P.C.

(57) ABSTRACT

A data relay controller for decreasing operation load and reducing circuit scale. The controller transfers a data block between a buffer memory and a computer. An access circuit writes the main data to or reads the main data from the buffer memory. An address generation circuit generates address data in accordance with a writing or reading head address of the main data provided from an external device. A counter counts the main data to generate a count value. An address skip control circuit skips the address data by a predetermined number of addresses corresponding to a storage area of the sub data or the parity data in the buffer memory in accordance with the count value and the head address.

13 Claims, 4 Drawing Sheets

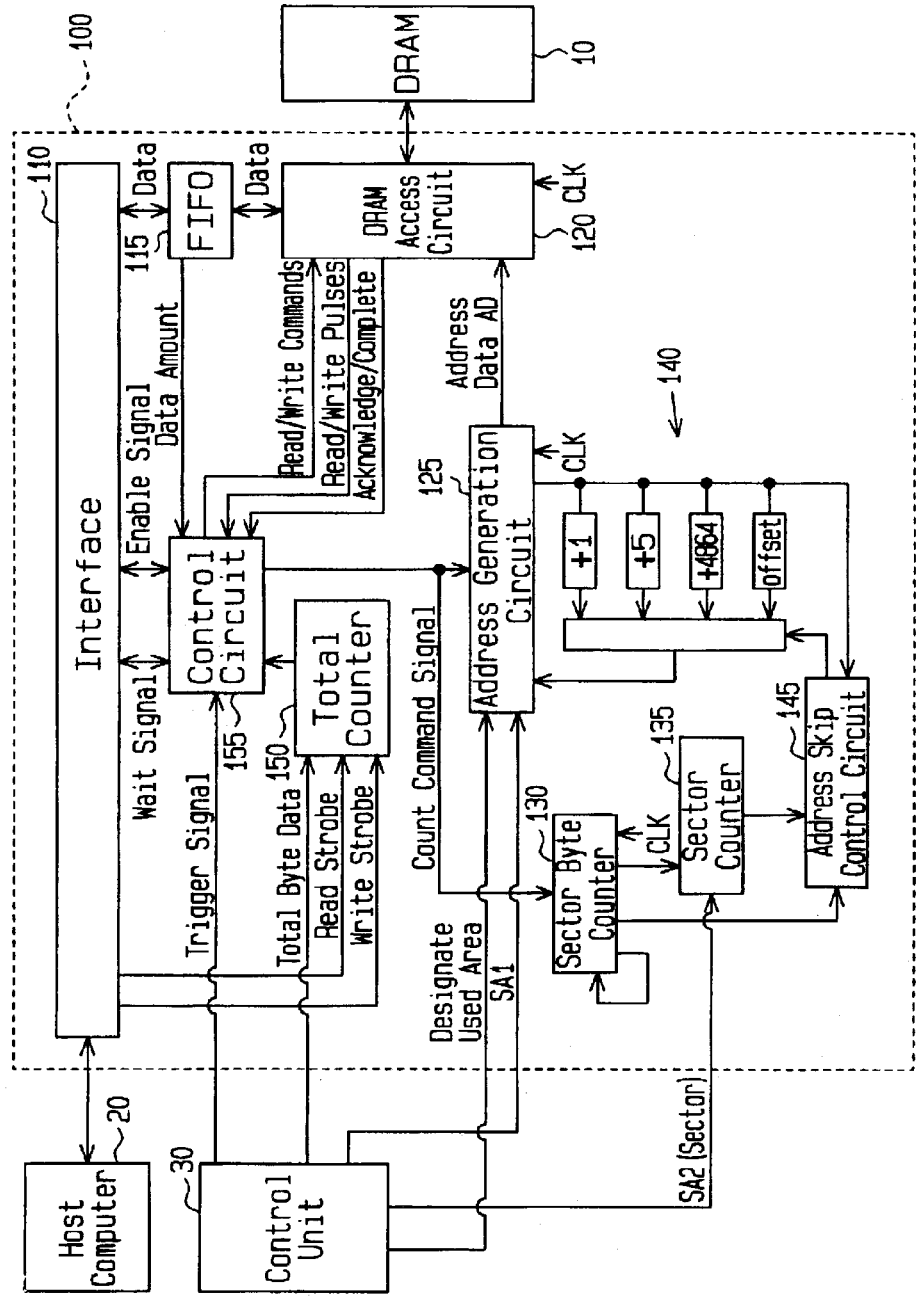

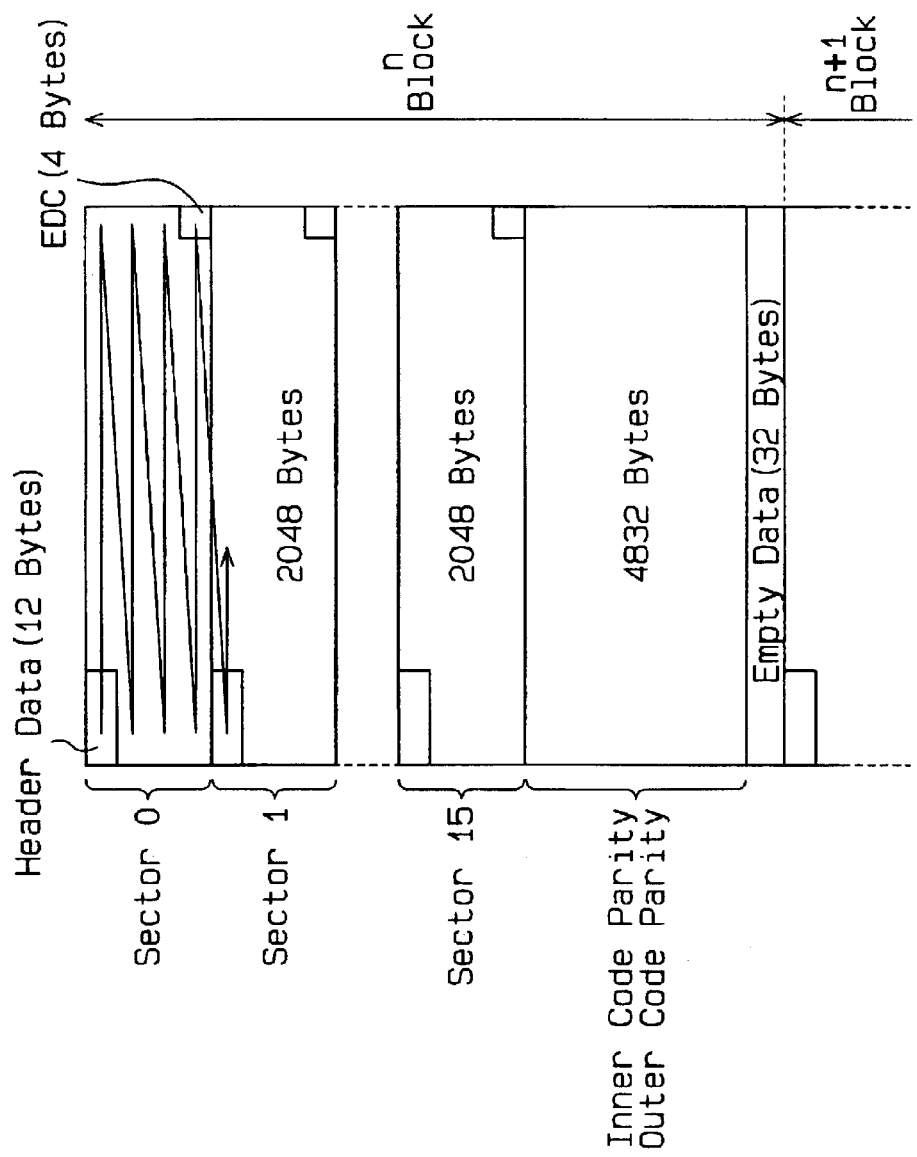

DATA RELAY CONTROLLER

CROSS-REFERENCE TO RELATED APPLICATIONS

This application is based upon and claims the benefit of priority from the prior Japanese Patent Application No. 2002-050050, filed on Feb. 26, 2002, the entire contents of which are incorporated herein by reference.

BACKGROUND OF THE INVENTION

The present invention relates to a data relay controller for relaying data to and from a buffer memory.

FIGS. 1 to 3 illustrate the logic format of data recorded on a known digital versatile disc (DVD). FIG. 1 shows the configuration of a data block to which an error correction code (ECC) is added. The data block includes information data, which is the desired recording information, such as dynamic image data or address information of divided data units. The data block also includes a first parity, which is applied to every predetermined piece of information data, and a second parity, which is applied to every predetermined amount of data including the information data and the first parity.

A data block includes 172×192 bytes of information data. The data block has 172 columns of data, each having a data length of 192 lines, in the vertical direction of the data block. An outer code parity (PO), which functions as the first parity and has a data length of 16 lines, is added to each column of data. Further, the data block has 192 rows (lines) of data, each having a data length of 172 bytes. An inner parity code (PI), which functions as the second parity and has a data length of 10 bytes, is added to each row of data and each line of the outer code parity.

FIG. 2 is a diagram illustrating an interleaved data block. The data block of FIG. 1 is interleaved and divided into 16 data sectors. Each data sector includes 12 lines of information data. Further, a line of the first parity is added to each data sector.

FIG. 3 illustrates the configuration of the data sector. The data sector includes 12 bytes of header data. The header data includes 4 bytes of identification data (ID), two bytes of identification error detection data (IED), and 6 bytes of copy management data (CPM). Further, the data sector includes 2,048 bytes of main data and four bytes of error detection code (EDC) data.

The data having such a format is temporarily stored in a dynamic random access memory (DRAM) of a DVD recording device or a DVD reproducing device.

In the data stored in the DRAM, only the main data is requested to be transferred to an external device. Further, only the main data is requested to be stored in the DRAM from the external device. When processing each request with a control unit that controls each process in the DVD recording device or the DVD reproducing device, the operation load applied to the control unit becomes large. This may drastically decrease the processing speed or cause deficiencies. To cope with such problems, an exclusive line for relaying data may be provided between the DVD recording device and reproducing device. However, this increases the circuit scale of the DVD recording device or reproducing device. Thus, the employment of such an exclusive circuit is not preferable.

SUMMARY OF THE INVENTION

In one aspect of the present invention, a data relay controller for use with an external device transfers a data block between a buffer memory and a computer. The data block includes a plurality of sectors, each containing main data and sub data, and parity data set in relation with the plurality of sectors. The data relay controller includes an address generation circuit for generating address data that designates access addresses of the buffer memory in a predetermined order in accordance with a writing or reading head address of the main data provided from the external device. An access circuit is connected to the address generation circuit for writing the main data to or reading the main data from the buffer memory in accordance with the address data. A counter counts the main data that is written to the buffer memory or read from the buffer memory to generate a count value. An address skip control circuit is connected to the address generation circuit for skipping address data by a predetermined number of addresses corresponding to a storage area of the sub data or the parity data in the buffer memory in accordance with the count value and the head address.

In a further aspect of the present invention, a data relay controller for use with an external device transfers first data and second data, which is related to the first data, between a buffer memory and a computer. The buffer memory includes a first data area for storing the first data and a second data area for storing the second data. The data relay controller includes an address generation circuit for generating address data that designates access addresses of the buffer memory in accordance with a writing or reading head address of the first data provided from the external device. An access circuit is connected to the address generation circuit for writing the first data to or reading the first data from the buffer memory in accordance with the address data. A counter counts the first data that is written to the buffer memory or read from the buffer memory to generate a count value. An address skip control circuit is connected to the address generation circuit for skipping address data by a predetermined number of addresses corresponding to the second data area in accordance with the count value and the head address.

A further aspect of the present invention is a method for transferring a data block between a buffer memory and a computer. The data block includes a plurality of sectors, with each sector containing main data and other data. The method includes indicating the head address of the main data of a sector for transfer to or from the computer, which omits the other data in that sector preceding the main data corresponding to the head address, reading or writing the main data from or to the buffer memory in accordance with the head address, and when the amount of data read or written from the buffer memory is equal to the total amount of main data in that sector extending from the head address, ceasing to read data from that sector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a schematic block diagram of a data relay controller according to a preferred embodiment of the present invention; and FIG. 5 is a diagram illustrating the format of data recorded to a DRAM with the data relay controller of FIG. 4.

DETAILED DESCRIPTION OF THE PREFERRED EMBODIMENTS

Figure 1:
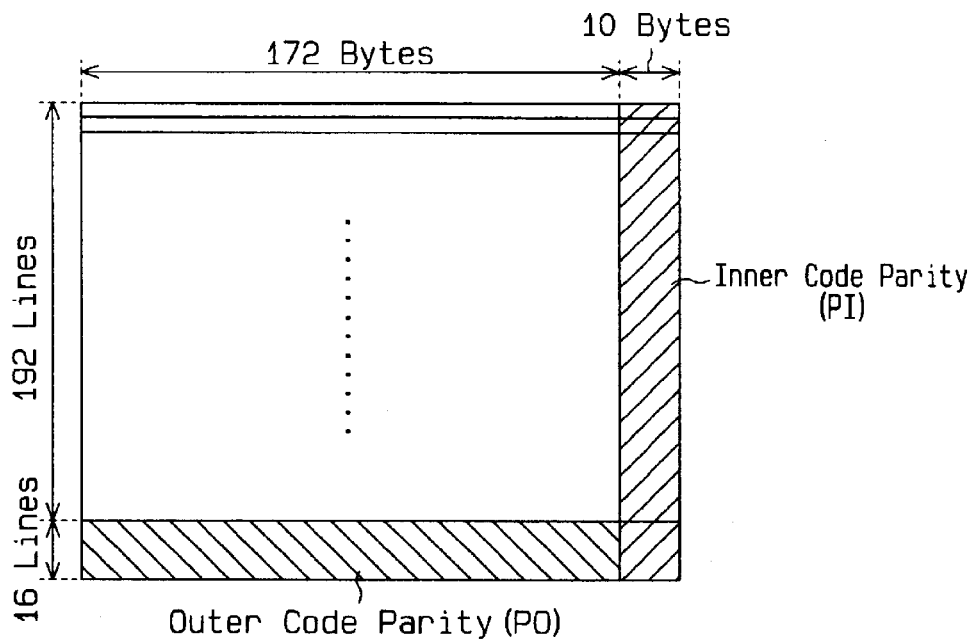
FIG. 1 is a diagram illustrating a DVD data block to which error correction code is added.

In the drawings, like numerals are used for like elements throughout.

FIG. 4 is a schematic block diagram of a DVD recording-reproducing device that includes a data relay controller 100 according to a preferred embodiment of the present invention.

The DVD recording-reproducing device includes a DRAM 10, which is a buffer memory, for temporarily storing data that is recorded on an optical disc. FIG. 5 illustrates the data that is stored in the DRAM 10, in accordance with memory addresses, and recorded on an optical disc. An address is allocated for each of the 16 data sectors. Subsequent to the data sectors, an address is allocated to an inner code parity and an outer code parity.

Subsequent to the parities, an address is allocated to 32 bytes of empty data (non-usage area). The data recorded on the DRAM 10 is cyclically recorded in block units.

A host computer 20 provides the DVD recording-reproducing device-with information data (e.g., dynamic image data), which serves as main data (first data). The host computer 20 further retrieves the main data from the DVD recording-reproducing device. A control unit 30 transfers data with the host computer 20 and controls each circuit in the DVD recording-reproducing device.

The data relay controller 100 transfers the data stored in the DRAM 10 in accordance with a transfer command provided from the host computer 20 via the control unit 30. When main data is transferred from the host computer 20, the data relay controller 100 writes data to the DRAM 10 in the format of FIG. 5.

The data relay controller 100 will now be discussed in detail. The data relay controller 100 includes an interface 110, a first in first out (FIFO) 115, a DRAM access circuit 120, an address generation circuit 125, a sector byte counter (first counter) 130, a sector counter (second counter) 135, a switching section 140, an address skip control circuit 145, a total counter 150, and a control circuit 155.

Data is transferred to and from the host computer 20 through the interface 110. The interface 110, is, for example, an ATA packet (ATAP) interface.

The DRAM access circuit 120 writes data to the DRAM 10 and reads data from the DRAM 10 in synchronism with a clock CLK, which is provided from a system clock generation circuit (not shown). The DRAM access circuit 120 generates a read pulse in synchronism with the reading of data from the DRAM 10 and generates a write pulse in synchronism with the writing of data to the DRAM 10.

A plurality of circuit blocks (not shown) instruct the DRAM access circuit 120 to write or read data. Thus, the DRAM access circuit 120 selectively performs data write and read commands and notifies each circuit block when the corresponding command is being performed. The DRAM access circuit 120 provides the circuit block that sends an access command to the DRAM 10 with an acknowledge signal and provides the circuit block with a complete signal when the reading or writing of data is completed.

The FIFO 115 temporarily stores data transferred between the interface 110 and the DRAM access circuit 120 and outputs the data in the stored order.

The address generation circuit 125 generates address data AD in accordance with a head address SA1, which is provided from the control unit 30. The DRAM access circuit 120 designates an access address in accordance with the address data AD. The head address SA1 indicates the head address of the main data that is subject to transfer to or from the host computer 20 in units of bytes. For example, if the head address of the main data is the 13th byte of the 2nd block, the byte indicating the head address SA1 is the sum of the data amount of a block, the 32 bytes of empty data, and the 13 bytes. The address data is generated in synchronism with the clock CLK.

The address generation circuit 125 switches the generation format of the address data when instructed by the control unit 30 to use a predetermined storage section of the DRAM 10 as a ring buffer. For example, when the DRAM 10 instructs the 0th address to the nth address of the DRAM 10 to be used as the ring buffer, the address generation circuit 125 generates cyclic address data to repetitively designate addresses 0 to n.

The sector byte counter 130 decrements a count value whenever a byte of data is read from or written to the DRAM 10. The initial value of the sector byte counter 130 is set at "2047" in correspondence with the main data amount (2,048 bytes) of a sector. The control unit 30 sets the initial value of the sector byte counter 130.

The sector byte counter 130 performs counting in accordance with the clock CLK. Thus, in synchronism with the transfer of each byte of data between the DRAM access circuit 120 and the DRAM 10, the sector byte counter 130 repetitively performs counting from the count value of "2047" to "0". When the main data is transferred from the DRAM 10 to the host computer 20, the count value of the sector byte counter 130 is decremented. When a sector of main data is transferred, the count value is "0". When the main data of the next sector is read, the count value is reset to "2047".

The sector counter 135 increments its count value whenever the sector byte counter 130 is reset. The sector counter 135 performs counting from "0" to "15" in correspondence with the sector number "16" in a single block. The sector counter 135 receives a sector address SA2 indicating the sector number of the sector to which the main data belongs from the control unit 30. The sector counter 135 sets the sector address SA2 (sector unit) as an initial value of the count value.

Whenever the amount of main data transferred between the DRAM access circuit 120 and the DRAM 10 reaches the data amount corresponding to one sector, the sector counter 135 increments the count value. The sector counter 135 resets the count value to "0" when the transferred main data reaches the boundary between a sector and a parity.

In response to a command from the address skip control circuit 145, the switching section 140 skips the address data AD, which is generated by the address generation circuit 125, by a number of addresses corresponding to a predetermined data amount.

When the count value of the sector byte counter 130 is reset, or when the boundary of data sector is detected, the address skip control circuit 145 controls the switching of the switching section 140. That is, when detecting the boundary of the data sector, the address skip control circuit 145 controls the switching section 140 so that the address generation circuit 125 generates address data to skip the four bytes of EDC data (second data) and the 12 bytes of header data (second data).

More specifically, when the address generation circuit 125 is provided with the head address SA1, the address generation circuit 125 calculates the skip amount from the head of the sector (offset amount) in accordance with the head address of the data sector (main data). That is, in DVD data, the head address of the main data in a sector is "13" since 12 bytes of header data is added in front of the main data. Thus, the address generation circuit 125 sets "12" as an offset amount in the switching section 140.

Whenever the sector byte counter 130 is reset, the address skip control circuit 145 adds the offset amount "12" to the skip amount "5" of the EDC data. The address skip control circuit 145 switches the switching section 140 so that the address generation circuit 125 generates the address data in which the added "17" bytes of data are skipped.

In accordance with the resetting of the sector counter 135, that is, in accordance with the boundary between the data sector and the parity code, the address skip control circuit 145 switches the switching section 140. More specifically, the address skip control circuit 145 switches the switching section 140 so that the address data AD corresponding to the skip amount obtained by adding 12 bytes of the header, 4 bytes of the EDC, 4,832 bytes of the parity code (second data), and 32 bytes of empty data (second data) is skipped. Thus, the address generation circuit 125 generates the address data AD that skips 4,881 bytes of data when a boundary between the data sector and the parity is detected. In FIG. 4, the value 4,864 indicates the data length of the parity and the empty data.

When the total counter 150 receives a target value (total byte data), which is set in accordance with the total transfer data amount or the total data amount, the total counter 150 performs counting until the count value becomes equal to the total byte data amount. More specifically, the total counter 150 performs counting in synchronism with a read strobe signal and a write strobe signal, which are provided from the host computer 20 via the interface 110. For example, when the total byte data has j bytes, the total counter 150 initiates the count value to "j" and decrements the count value in synchronism with the read strobe signal and the write strobe signal. When the data amount reaches the total data amount (the count value being "0"), the total counter 150 notifies the control circuit 155 that the data amount has reached the total data amount.

When the control circuit 155 sends data to the host computer 20 or receives data from the host computer 20, the control circuit 155 is provided with a data transfer command from the control unit 30 and controls each section of the data relay controller 100 in accordance with the command. The control circuit 155 will now be discussed.

When the control circuit 155 receives a trigger signal, which indicates the transfer of data to the host computer 20, the control circuit 155 generates a read command signal and provides the read command signal to the DRAM access circuit 120. In accordance with the read pulse, acknowledge signal, and complete signal from the DRAM access circuit 120, the control circuit 155 generates a count command signal and provides the address generation circuit 125 and the sector byte counter 130 with the count command signal.

The count command signal has a data length corresponding to the pulse number of the read pulse signal generated during the period from when the acknowledge signal is provided to when the complete signal is provided. In accordance with the count command signal, the address generation circuit 125 generates the address data AD in synchronism with the clock CLK. In accordance with the count command signal, the sector byte counter 130 decrements the count value in synchronism with the clock CLK. Therefore, the count command signal synchronizes the operations of the address generation circuit 125 and the sector byte counter 130 with the reading of data from the DRAM 10 by the data relay controller 100.

When the control circuit 155 receives a trigger signal, which indicates the transfer of data from the host computer 20, the control circuit 155 generates a write command signal and provides the write command signal to the DRAM access circuit 120. In accordance with the write pulse, acknowledge signal, and complete signal from the DRAM access circuit 120, the control circuit 155 generates a count command signal and provides the address generation circuit 125 and the sector byte counter 130 with the count command signal.

The count command signal has a data length corresponding to the pulse number of the write pulse signal, which is generated from when the acknowledge signal is input to when the complete signal is input. The count command signal synchronizes the operations of the address generation circuit 125 and the sector byte counter 130 with the writing of data to the DRAM 10 with the data relay controller 100.

Further, when the control circuit 155 receives the trigger signal, the control circuit 155 generates an enable signal and provides the enable signal to the host computer 20 via the interface 110. When the count value of the total counter 150 becomes "0", the control circuit 155 generates a wait signal and provides the wait signal to the host computer 20. The control circuit 155 notifies the host computer 20 that the transfer of data has ended with the wait signal and stops providing the DRAM access circuit 120 with the write command signal or the read command signal.

In the preferred embodiment, the address data AD is generated in accordance with the head address SA1, which is provided to the address generation circuit 125 from the control unit 30. In accordance with the address data AD, the main data is read from the DRAM 10 and transferred to the host computer 20. When the DRAM access circuit 120 receives the main data from the host computer 20, the DRAM access circuit 120 writes the main data to the DRAM 10 in accordance with the address data AD.

In the preferred embodiment, main data is properly transferred between the host computer 20 and the DRAM 10 just by basically designating the head address SA1. This reduces the operation load resulting from data relaying. Accordingly, the configuration of the data relay controller 100 is facilitated.

Further, the control circuit 155 performs advanced reading. When advanced reading is being performed, if there is a request for the transfer of data to the host computer 20, data in an amount greater than the amount of the requested data, is read from the DRAM 10. When the total counter 150 counts the requested data amount in synchronism with the read strobe signal from the total counter 150, the control circuit 155 stops providing the interface 110 with the enable signal. Thus, even if advanced reading is performed, the requested amount of data is transferred to the host computer 20.

The control circuit 155 monitors the amount of data stored in the FIFO 115 while performing the following processes in accordance with the monitored data amount.

1. Interruption of Output of Read/Write Command signals to DRAM access circuit

When reading data from the DRAM 10, if the amount of data stored in the FIFO 115 is greater than or equal to a predetermined amount, the control circuit 155 predicts that data cannot be stored in the FIFO 115 and interrupts the output of the read command. When writing data to the DRAM 10, if the amount of data stored in the FIFO 115 is less than or equal to a predetermined amount, the control circuit 155 predicts that data cannot be provided to the DRAM access circuit 120 from the FIFO 115 and interrupts the output of the write command.

2. Permission and Prohibition of Output of Read/Write Strobe Signals to Host Computer 20

When reading data from the DRAM 10, if the amount of data stored in the FIFO 115 is less than or equal to a predetermined amount, the control circuit 155 predicts that data cannot be transferred to the host computer 20 from the FIFO 115 and generates a wait signal. The wait signal is provided to the host computer 20. The wait signal interrupts the data transfer command. In this state, the transmission of the read strobe signal to the total counter 150 is temporarily stopped.

When writing data to the DRAM 10, if the amount of data stored in the FIFO 115 is greater than or equal to a predetermined amount, the control circuit 155 predicts that the data provided from the host computer 20 cannot be stored in the FIFO 115 and generates a wait signal. The wait signal is provided to the host computer 20. The wait signal interrupts the transfer of the data. In this state, the transmission of the write strobe signal to the total counter 150 is temporarily stopped.

The data relay controller 100 has the advantages described below.

(1) The sector byte counter 130 detects the boundary of a data sector. The sector counter 135 detects the boundary between a data sector and a parity code. In accordance with the detection of each boundary, the address skip control circuit 145 skips the address data AD of the DRAM 10 by the amount of addresses corresponding to the storage area of the header data and the parity code. Thus, by providing the head address SA1 to the address generation circuit 125 from the control unit 30, main data is relayed between the DRAM 10 and the host computer 20. Accordingly, the operation load resulting from the relay of the main data between the DRAM 10 and the host computer 20 is properly reduced.

(2) The head address SA1 is provided to the address generation circuit 125 in byte units. The sector address SA2 is provided to the sector counter 135 in sector units. Thus, in the data storage area of the DRAM 10, in addition to a head position of an area to which the main data is allocated, the head address may be designated by a median position of the area in which the main data is allocated. As a result, any number of bytes may be read from the main data stored in the DRAM 10.

(3) The address generation circuit 125 retrieves a command from the external device to use a predetermined data storage area of the DRAM 10 as a ring buffer. In accordance with the command, the address generation circuit 125 switches the address data to cyclic address data. In other words, the data storage area of the DRAM 10 is variably set.

(4) In response to a data transfer request from the host computer 20, the data relay controller 100 performs advanced reading, in which data having an amount greater than the requested data amount is transferred to the FIFO 115 in advance. This enables quick response to a data request from the host computer 20.

(5) The control circuit 155 permits the operations of the sector byte counter 130 and the address generation circuit 125 in accordance with the read/write pulses and acknowledge/complete signals from the DRAM access circuit. Thus, even when the DRAM access circuit 120 receives a data read or write command from multiple circuits, the counting of the sector byte counter 130 and the generation of addresses by the address generation circuit 125 synchronizes the transfer of data between the data relay controller 100 and the DRAM 10.

It should be apparent to those skilled in the art that the present invention may be embodied in many other specific forms without departing from the spirit or scope of the invention. Particularly, it should be understood that the present invention may be embodied in the following forms.

The address generation circuit 125 is not required to have a function for retrieving a command to use a predetermined data storage area of the DRAM 10 as a ring buffer.

The DRAM access circuit 120 may be used as an exclusive circuit for the control circuit 155. In this case, the DRAM access circuit 120 does not have to generate the acknowledge signal or the complete signal. Further, the generation of the count command signal in the control circuit 155 is facilitated. In this case, the sector byte counter 130 or the address generation circuit 125 may start to operate in response to a trigger signal instead of when receiving a count command signal.

The total counter 150 does not necessarily have to be synchronized with the read strobe signal or the write strobe signal. In this case, for example, the total counter 150 receives a counter command signal and performs counting in synchronism with the clock CLK in accordance with the counter command signal.

The total counter 150 may be eliminated. In this case, the writing or reading of a predetermined amount of main data is performed in accordance with, for example, a head address. It is preferred that the predetermined amount be the data amount of multiple sectors.

The sector byte counter 130 may perform counting by incrementing a count value. The counting range of the sector byte counter 130 may be fixed.

The control circuit 155 is not required to have a function for generating a write command.

The address generation circuit 125 may receive a block address, which indicates a data block including the data head, in block units and initializes the address data in accordance with the head address SA1 and the block address.

The skip amount from the head of a data sector may be predetermined by the switching section 140 instead of being obtained by the address generation circuit 125.

Figure 2:
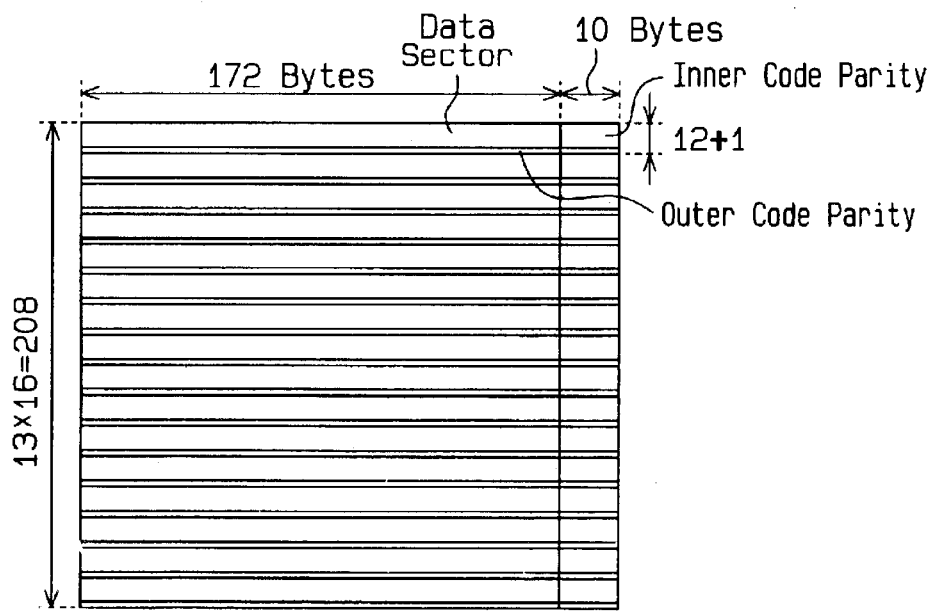
FIG. 2 is a diagram illustrating the DVD data block in an interleaved state.
Figure 3:
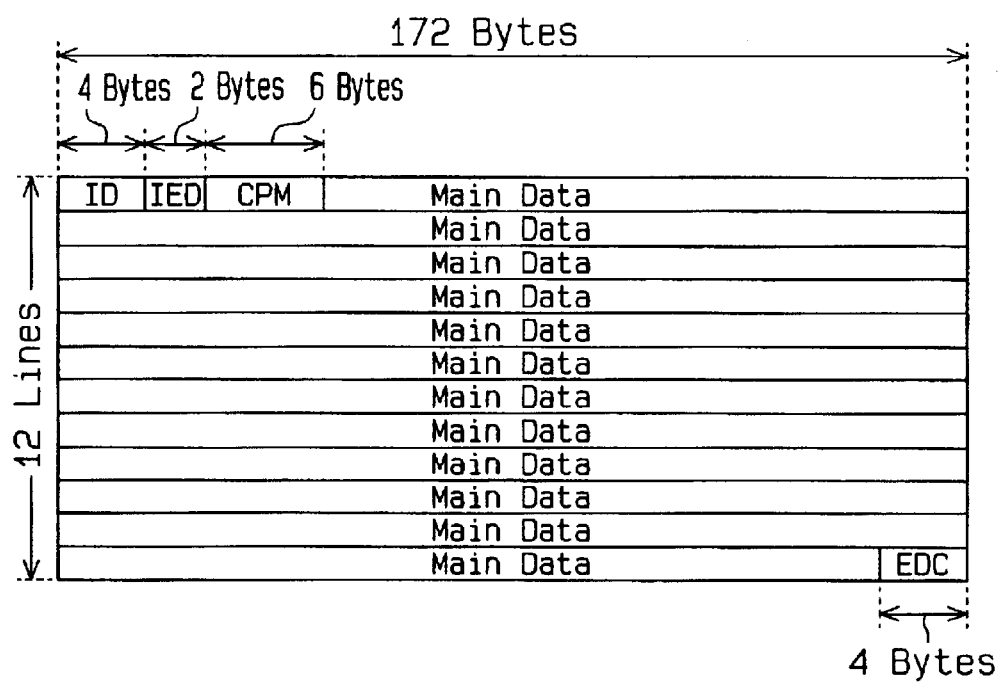
FIG. 3 is a diagram illustrating a data sector in the data block of FIG. 2.

The data format is not limited to the format illustrated in FIGS. 1 to 3. The data block includes main data and sub data and may include multiple data sectors to which a parity code is added.

The buffer memory may be, for example, an SRAM. In this case, an access circuit that is optimal for an SRAM may be used in lieu of the DRAM access circuit 120.

The present examples and embodiments are to be considered as illustrative and not restrictive, and the invention is not to be limited to the details given herein, but may be modified within the scope and equivalence of the appended claims.

What is claimed is:

1. A data relay controller for use with an external device for transferring a data block between a buffer memory and a computer, wherein the data block includes a plurality of sectors, each containing main data and sub data, and parity data set in relation with the plurality of sectors, the data relay controller comprising:

an address generation circuit for generating address data that designates access addresses of the buffer memory in a predetermined order in accordance with a writing or reading head address of the main data provided from the external device;

an access circuit connected to the address generation circuit for writing the main data to or reading the main data from the buffer memory in accordance with the address data;

a counter for counting the main data that is written to the buffer memory or read from the buffer memory to generate a count value; and an address skip control circuit connected to the address generation circuit for skipping address data by a predetermined number of addresses corresponding to a storage area of the sub data or the parity data in the buffer memory in accordance with the count value and the head address.

2. The data relay controller according to claim 1, wherein the access circuit sequentially writes the main data successively transferred from the computer in a predetermined storage area while skipping the storage area of the sub data or the parity data in the buffer memory in accordance with the address data skipped by the address skip control circuit.

3. The data relay controller according to claim 1, wherein the access circuit sequentially reads the main data from a predetermined storage area that excludes the storage area of the sub data and the parity data in the buffer memory in accordance with the address data skipped by the address skip control circuit.

4. The data relay controller according to claim 1, further comprising:

a total counter for counting data that is written to the buffer memory in units of bytes from when the writing of the data to the buffer memory is started until the amount of the written data reaches a target value; and a control circuit connected to the total counter to generate a write command signal in accordance with a data write request and provide the write command signal to the access circuit, wherein the control circuit stops providing the write command signal to the access circuit when the count value of the total counter reaches the target value.

5. The data relay controller according to claim 1, further comprising:

a total counter for counting data that is read from the buffer memory in units of bytes from when the reading of the data from the buffer memory is started until the amount of the read data reaches a target value; and a control circuit connected to the total counter to generate a read command signal in accordance with a data read request and provide the read command signal to the access circuit, wherein the control circuit stops providing the read command signal to the access circuit when the count value of the total counter reaches the target value.

6. The data relay controller according to claim 1, wherein the counter includes:

a sector byte counter for counting the amount of data transferred between the access circuit and the buffer memory in units of bytes; and a sector counter connected to the sector byte counter to count the transferred amount of data in sector units in accordance with a count value of the sector byte counter.

7. The data relay controller according to claim 6, wherein the address generation circuit receives the head address and initializes the count value in accordance with the sector address.

8. The data relay controller according to claim 6, wherein the address generation circuit receives the head address and an address of the data block related with the head address and initializes the address data in accordance with the head address and the data block address, and wherein the sector counter receives the address of a sector related with the head address and initializes the count value in accordance with the sector address.

9. The data relay controller according to claim 1, wherein the address generation circuit generates cyclic address data that cycles a predetermined data area in the buffer memory.

10. A data relay controller for use with an external device for transferring first data and second data, which is related to the first data, between a buffer memory and a computer, wherein the buffer memory includes a first data area for storing the first data and a second data area for storing the second data, the data relay controller comprising:

an address generation circuit for generating address data that designates access addresses of the buffer memory in accordance with a writing or reading head address of the first data provided from the external device;

an access circuit connected to the address generation circuit for writing the first data to or reading the first data from the buffer memory in accordance with the address data;

a counter for counting the first data that is written to the buffer memory or read from the buffer memory to generate a count value; and an address skip control circuit connected to the address generation circuit for skipping address data by a predetermined number of addresses corresponding to the second data area in accordance with the count value and the head address.

11. The data relay controller according to claim 10, wherein the first data includes main data, the second data includes sub data and parity data, and the main data and the sub data configure a sector, the parity data being set to more than one sector.

12. The data relay controller according to claim 11, wherein the second data area includes a sub data area for storing the sub data and a parity data area for storing the parity data, and wherein the counter includes:

a first counter for counting the main data in predetermined units to generate a first count value; and a second counter connected to the first counter for counting the main data in sector units in accordance with the first count value to generate a second count value;

wherein the address skip control circuit skips the address data by a number of addresses corresponding to the sub data area when the first count value reaches a predetermined number, and skips the address data by a number of addresses corresponding to the parity data area when the second count value reaches a predetermined number.

13. The data relay controller according to claim 12, wherein the address generation circuit receives the head address and initializes the address data in accordance with the head address, and the sector counter receives an address of a sector related with the head address and initializes the count value in accordance with the sector address.

* * * * *